US 6,439,273 B1

(12) United States Patent
Krüger et al.

(10) Patent No.: US 6,439,273 B1
(45) Date of Patent: Aug. 27, 2002

(54) METHOD AND APPARATUS FOR CLEANING FILTER CANDLES IN A CANDLE FILTER

(75) Inventors: Roland Krüger, Herdecke; Markus Kolczyk, Waldstetten; Rainer Kuhnt; Dietmar Oechsle, both of Schwäbisch-Gmünd, all of (DE)

(73) Assignee: KHS Maschinen- und Anlagenbau AG, Dortmund (DE)

( * ) Notice: Subject to any disclaimer, the term of this patent is extended or adjusted under 35 U.S.C. 154(b) by 0 days.

(21) Appl. No.: 09/551,126

(22) Filed: Apr. 18, 2000

Related U.S. Application Data

(63) Continuation-in-part of application No. PCT/EP99/05768, filed on Aug. 9, 1999.

(30) Foreign Application Priority Data

Aug. 19, 1998 (DE) ......................................... 198 37 569

(51) Int. Cl.[7] .......................... B01D 29/33; B01D 29/66
(52) U.S. Cl. ........................ 141/11; 141/69; 210/797; 210/798; 210/323.2; 210/332; 210/333.01; 210/409; 210/411; 210/412
(58) Field of Search .................... 141/11, 69; 210/797, 210/798, 323.2, 332, 333.01, 408, 409, 411, 412

(56) References Cited

U.S. PATENT DOCUMENTS 5,437,788 A  8/1995  Geibel et al. ........... 210/333.01

FOREIGN PATENT DOCUMENTS

DE       2227821    12/1973   ........... B01D/41/00
DE      19518575    11/1996   ........... B01D/29/54

OTHER PUBLICATIONS

Liquid–Solid Operations and Equipment, *Perry's Chemical Engineers' Handbook*, Seventh Edition, Robert Perry and Don W. Green, 1997, pp. 18–92 and 18–93.
Filtration, *Kirk–Othmer, Encyclopedia of Chemical Technology*, Fourth Edition, vol. 10, Jacqueline I. Kroschwitz, pp. 788–789, 820–821, 1993.

*Primary Examiner*—Robert Popovics
(74) *Attorney, Agent, or Firm*—Nils H. Ljungman & Associates

(57) ABSTRACT

A method and apparatus for cleaning candles in a candle filter using a cleaning fluid that flows inside the candle from the side of the filtrate, whereby said fluid is pressed in an opposite direction to the direction of the filtrate from the inside to the outside, through said candles, by a gaseous medium subjected to an overpressure. Water is or can be used as an appropriate cleaning fluid and air is used as a gaseous medium. The prior art teaches nozzle-shaped contractions that are respectively disposed on the outlet end of the candles or deflectors arranged inside the candle at a distance from said contractions, whereby the in-flowing cleaning fluid is deflected towards all sides in the direction of the inner walls of the candles, are provided for distribution of said cleaning fluid. One disadvantage of this prior art is that the nozzle-shaped contractions which feed fluid into the inside of the candles are also used for compressed air, whereby it is impossible for the cleaning fluid to flow when a pressure impulse is fed in. The aim of the invention is to provide an improved solution to this problem so that the cleaning liquid can continue to flow automatically inside the candle despite the presence of a pressurized gaseous medium so that the inside of the candle can be quasi-constantly impinged upon by the cleaning fluid. In order to achieve this, the cleaning fluid and the gaseous medium are fed into the inside of the candles via separate flow paths.

20 Claims, 6 Drawing Sheets

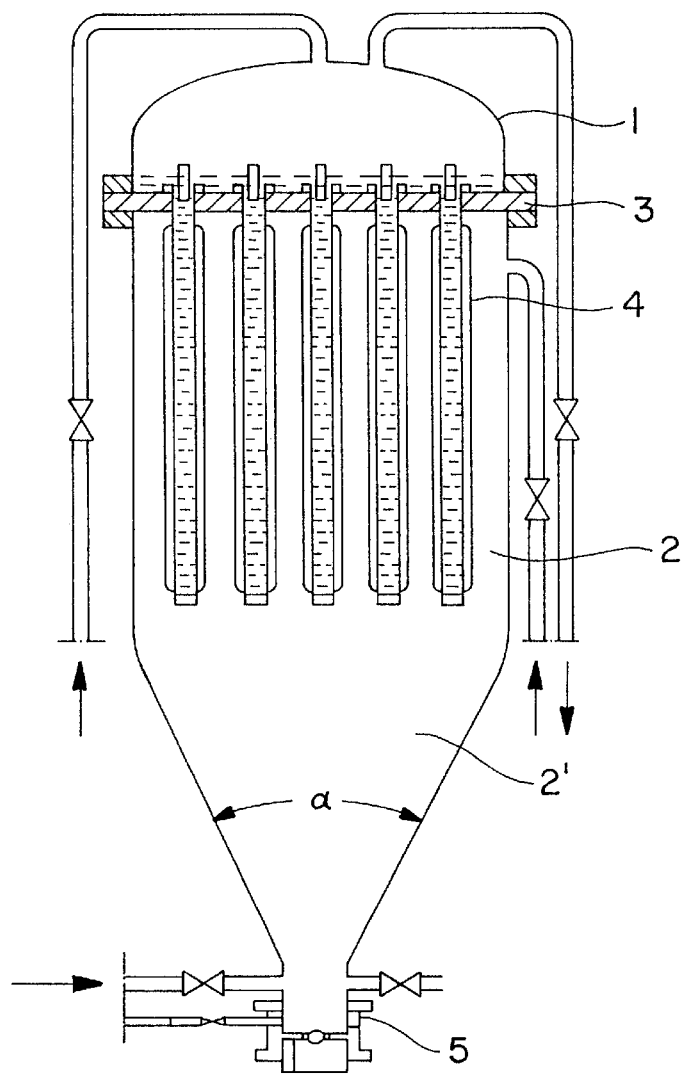
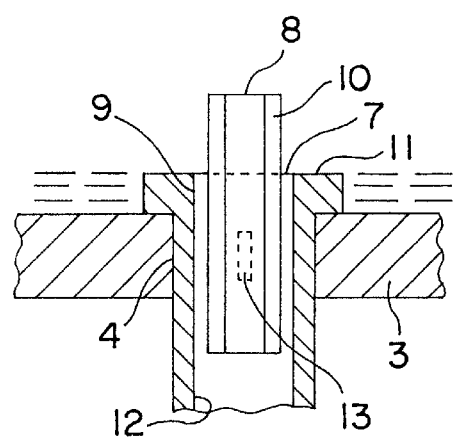
FIG. 1
FIG. 2

METHOD AND APPARATUS FOR CLEANING FILTER CANDLES IN A CANDLE FILTER

CONTINUING APPLICATION DATA

The present invention is a continuation-in-part of International Patent Application No. PCT/EP99/05678, filed on Aug. 9, 1999 in which the United States of America was a designated state and in which the United States of America remains a designated state as of the filing of the Patent Application. International Application No. PCT/EP99/05678 was pending as of the filing date of this application.

BACKGROUND OF THE INVENTION

1. Field of the Invention:

The present invention relates to a method for cleaning filter candles of a candle filter using a cleaning fluid which is in-flowing from the filtrate side into the interior of the candle, which cleaning fluid is pressed through the filter candle, in the direction opposite to the filtrate direction, by means of a gaseous medium under an overpressure, from the interior to the exterior, as well as to apparatus for carrying out such method.

2. Background Information:

In a known method of cleaning filter equipment, the filter cake produced at the filter on the side of the un-filtrate of the filter equipment is removed thereby that the interior space at the inlet-side, as well as part of the filtrate space positioned above the inlet-side interior space, when the exit-side is closed, is filled with water from the un-filtrate side, whereby the air positioned above the water is compressed in the filtrate space. Upon filling in of the water and compression of the air in the upper space of the filtrate space, a discharge is opened all of a sudden on the un-filterated side such that the air under pressure causes an intense back-flow of the water present in the filtrate space, through the filter, and thereby the filter cake accumulated on the un-filtrate side of the filter is removed from the filter, and is mixed with the water present in the un-filtrate space, and with this is removed through the drain from the filter equipment.

This method is rather simple but has the decisive disadvantage which is to be seen therein that the filter cake removed from the filter is mixed with such a volume of water which is nearly equal to the total volume of both interior spaces of the filtering equipment. Since this water which includes the filter cake can not be passed to sewage in this condition, subsequently a laborious separation of the sludge from the water is necessary. This is the cause of high equipment costs and not insignificant operating costs.

In a further known method for cleaning filtering equipment with installed filter, a cleaning fluid is brought to an overpressure, in a separate container, and for carrying out the cleaning, is brought, via an inlet conduit, to the removal-side of the filter equipment, and from there is pressed through the filter in the direction opposite to the direction of filtration. For moving the cleaning fluid from the accumulated (or special, separate) container to the filtering equipment, a gaseous medium under overpressure is used.

As cleaning medium, usefully, water is employed and as gaseous medium air is used. For distribution of the cleaning fluid serve, respectively at the removal-side candle end arranged nozzle-shaped constrictions, or at a distance from such constriction in the candle interior arranged impact bodies, with which the in-flowing cleaning fluid is deflected to all sides in the direction of the interior walls of the candles.

In other words, nozzle-shaped constrictions are arranged at that end of a candle which is at the filtrate removal side, for distribution of the cleaning fluid. Alternatively, at a distance away from such constrictions are arranged impact bodies for deflection of cleaning fluid.

This has the disadvantage that the nozzle-shaped constrictions are present for the introduction of the cleaning fluid into the interior of the filter candle, as well as for the air under pressure, such that on termination of a pressure impulse, a post-flow, or, in other words, a trailing or tailing type of flow behavior, of cleaning fluid is not possible.

In German Laid Open Patent Application No. 2 227 821 there is disclosed a method comprising the steps of emptying the portion or compartment receiving liquid to be filtered and replacing the emptied volume or space with a pressurizing gas acting in the direction opposite to the pressure in the filter elements and the compartment or portion receiving filtered liquid.

In German Laid Open Patent Application 195 18 575 A1 there is disclosed an extension element of the filter candle, which element extends into the filtrate compartment. Water under pressure of cleaning air is then forced through the extension element and the filter candles.

U.S. Pat. No. 5,437,788 to S. A. Geibel et al. is concerned with a filter assembly comprising: a housing divided into a first chamber and a second chamber, the second chamber being arranged to contain a backwash liquid; a filter element disposed in the first chamber and having an interior; a conduit disposed in the second chamber and having an interior which communicates with the interior of the filter element and an opening which communicates with the second chamber; a weep hole arranged to drain backwash liquid from the second chamber into the filter element or the conduit, the weep hole being below the opening in the conduit; and a gas feed pipe arranged to introduce pressurized gas into the second chamber to force the backwash liquid through the conduit and into the filter element.

In other words, this invention is concerned in one aspect with cleaning of tubular filter candles or elements of a tubular filter arrangement, in which vertical tubes or cartridges, i.e., candles, are supported by a filtrate-chamber tube sheet in a vertical cylindrical vessel, compare pages 18-92 and 18-93 in Liquid-Solid Operations and Equipment in PERRY'S CHEMICAL ENGINEERS' HANDBOOK, Seventh Edition, Robert H. Perry and Don W. Green, 1997, The McGraw-Hill Companies, Inc., ISBN 0-07-049841-5, incorporated herein by reference.

Also in other words, in filtration is achieved the separation of two phases, particulate form, i.e., solid particles or liquid droplets in suspension, and continuous, i.e., liquid or gas, from a mixture, herein also referred to as un-filtrate or liquid to be filtered, by passing the mixture through a porous medium. This may be cylindrical element filters, often referred to as candle filters, in which cylindrical elements or sleeves are mounted vertically and suspended from a header sheet, which divides the filter vessel into two separate compartments. The advantage of candle filters is that as the cake grows on the tubular elements the filtration area increases and the thickness of a given volume of cake is therefore less than it would be on a flat element, compare Filtration in Volume 10 of KIRK-OTHMER, ENCYCLOPEDIA OF CHEMICAL TECHNOLOGY, Fourth Edition, Jacqueline I. Kroschwitz; editor, 1993, John Wiley & Sons, Inc., ISBN 0-471-52679-9 (v. 10), also incorporate herein by reference.

OBJECT OF THE INVENTION

The object of the invention resides here therein to find an improved solution with which it is possible, despite introduction of the gaseous medium under pressure, that there is achieved, at all times, an automatic post-flow of the cleaning fluid into the candle interior, so that, in a practical manner, constantly an impacting of the interior of the candle with this cleaning fluid can be assured.

In other words, there is established in accordance with one object a substantially automatic and effective flow of the cleaning liquid or fluid, including post-flow or tailing or trailing behavior thereof, so as to provide for enhanced removal of filter cake.

Another object resides therein to ensure that a continuously effective layer or sheet or film of cleaning liquid is provided at the interior surface of filter candles so as to assure a more rapid and improved removal of filter cake adhering to a filter element or candle, using an efficient volume of cleaning liquid.

SUMMARY OF THE INVENTION

The present invention teaches that these objects can be accomplished by a method thereby that the cleaning fluid and the gaseous medium are introduced into the interior of the filter candle through stream paths which are separate from one another.

In other words, a gaseous medium and cleaning fluid are flowed through the candle, but through separate passages, in the direction opposite to the direction of flow of the suspension or liquid which is to be filtered.

Thereby it was found useful in independent configuration of the invention that under maintenance of the cleaning liquid introduction, a constant fluid film is obtained, and this can be impacted by pulsating introduction of pressurizing gas.

In an advantageous embodiment of the method with pulsating pressurizing gas introduction it is contemplated that the time-wise intervals of pulsating pressurizing gas introduction correspond at least to the time-wise building-up of a fluid film which again impacts the interior wall, respectively, the pulsating pressurizing gas introduction is only then commenced as soon as at the interior wall of the candle there has been formed a fluid film extending over the full length.

The invention further relates to a filtering arrangement with back-washing capability with a separation plane, between the un-filtrate space and the filtrate space, and filter candles held therein with their upper ends, with the interior space thereof being disposed so as to have the forward opening extend into the filtrate space, whereby the forward opening has two openings which are separate from one another, and which with respect to height terminate at different levels.

In an independent embodiment of the filter arrangement with back-washing capability it is contemplated that the forward opening of the filter candle has an inlet-line for cleaning fluid and, separate with respect to the inlet-line and at a higher plane terminating, a second inlet-line for a gaseous medium under pressure.

As useful embodiment of the filter arrangement with back-wash capability it is contemplated that the inlet-line for cleaning fluid is configured as annular gap which, on the one hand, is formed by the interior wall of the filter candle and, on the other hand, by a pipe piece which is provided for the introduction of a gaseous medium, and this pipe piece is terminating above the filter candle and/or the annular gap.

With the method in accordance with the invention and the for this configured filter arrangement with back-wash capability, it is ensured that in practical manner a constant fluid film can flow from the filtrate space into the interior of the filter candles, and in this manner a closed fluid film is formed at their interior walls, which achieves, on impacting with pressure, a uniform and assured removal of the filter cake. Particularly when employing a pulsation pressure impacting there can, within a short period of time, the for the cleaning provided fluid film be built up in the interior of a candle, whereby there is accomplished a substantially more One feature of the invention resides broadly in a method of operating a plant in which containers are filled with liquid, said method comprising the steps of:
  (a) moving containers to a filling machine;
  (b) filling said containers with liquid when filtered;
  (c) removing filled containers from said filling machine, said filtered liquid being produced by
  (d) providing a liquid to be filtered in a first batch to a filter apparatus having candle filter elements, at least a portion for receiving liquid to be filtered, and a portion for receiving liquid when filtered;
  (e) moving said first batch of said liquid to be filtered in a first direction from a first surface to a second surface of said candle filter elements, from said portion receiving liquid to be filtered, through said candle filter elements and thereby collecting solids at said first surface of said candle filter elements as filter cake;
  (f) terminating filtering according to Steps (d) and (e);
  (g) intiating flow of a cleaning liquid along a first flow path, over said second surface, for inducing removal of filter cake from said candle filter elements by flowing a sheet of cleaning liquid over said second surface;
  (h) pressurizing and directing a flow of gaseous medium in a second flow path separate from said first flow path to force said sheet of cleaning liquid flowing on said second surface through said candle filter elements from said second surface to said first surface, to thus dislodge said filter cake on said first surface;
  (i) removing said filter cake from said candle filter elements by the interaction of cleaning liquid and gaseous medium;
  (j) terminating cleaning according to Steps (g), (h) and (i); and
  (k) moving a second batch of liquid in said first direction through said candle filter elements.

Another feature of the invention resides broadly in a plant in which containers are filled with liquid, comprising: apparatus for moving containers to a filling machine; a machine for filling said containers with liquid when filtered;
  apparatus for removing filled containers from said filling machine, said filtered liquid being procured by apparatus for providing a liquid to be filtered in a first batch to a filter apparatus having candle filter elements, at least a portion for receiving liquid to be filtered, and a portion for receiving liquid when filtered;
  apparatus for moving said first batch of said liquid to be filtered in a first direction from a first surface to a second surface of said candle filter elements, from said portion receiving liquid to be filtered, through said candle filter elements and thereby collecting solids at said first surface of said candle filter elements as filter cake;
  apparatus for terminating filtering by said filter apparatus;
  apparatus for initiating flow of a cleaning liquid along a first flow path, over said second surface, for inducing removal of filter cake from said candle filter elements by flowing a sheet of cleaning liquid over said second surface;

apparatus for pressurizing and directing a flow of gaseous medium in a second flow path separate from said first flow path to force said cleaning liquid flowing on said second surface through said candle filter elements from said second surface to said first surface, to thus dislodge said filter cake on said first surface;

apparatus for removing said filter cake from said candle filter elements by the interaction of cleaning liquid and gaseous medium;

apparatus for terminating operation of said apparatus for initiating flow of a cleaning liquid, said apparatus for pressurizing, and said filter cake removal apparatus; and apparatus for moving a second batch of liquid in said first direction through said candle filter elements.

Yet another feature of the invention resides broadly in a method of operating and cleaning filter apparatus having filter elements, at least a portion for receiving a liquid having solids suspended therein, and a portion for receiving liquid when filtered, said method comprising the steps of:

(a) moving a first batch of said liquid having solids suspended therein in a first direction from said portion for receiving a liquid having solids suspended therein through said filter elements from a first surface to a second surface of said filter elements and thereby collecting solids at said first surface of said filter elements as filter cake;

(b) terminating filtering according to Step (a);

(c) initiating flow of a cleaning liquid along a first flow path, over said second surface of said filter elements, for inducing removal of filter cake from said filter elements by a flowing layer of cleaning liquid;

(d) pressurizing and directing a flow of gaseous medium in a second flow path separate from said first flow path to force said cleaning liquid passing over said second surface to permeate from said second surface to said first surface of said filter elements and to thus dislodge said filter cake on said first surface of said filter elements;

(e) terminating cleaning according to Steps (c) and (d);

(f) removing said filter cake obtained by said filter elements through interaction of cleaning liquid and gaseous medium; and (g) moving a second batch of suspension in said first direction through said filter elements.

Still another feature of the invention resides broadly in a plant operating and cleaning filter apparatus having filter elements, at least a portion for receiving a liquid having solids suspended therein, and a portion for receiving liquid when filtered, comprising:

apparatus for moving a first batch of said liquid having solids suspended therein in a first direction from said portion for receiving a liquid having solids suspended therein through said filter elements from a first surface to a second surface of said filter elements and thereby collecting solids at said first surface of said filter elements as filter cake;

apparatus for terminating filtering by said apparatus for moving a first batch of said liquid having solids suspended therein;

apparatus for initiating flow of a cleaning liquid along a first flow path, over said second surface of said filter elements, for inducing removal of filter cake from said filter elements by a flowing layer of cleaning liquid;

apparatus for pressurizing and directing a flow of gaseous medium in a second flow path separate from said first flow path to force said cleaning liquid passing over said second surface to permeate from said second surface to said first surface of said filter elements and to thus dislodge said filter cake on said first surface of said filter elements;

apparatus for terminating action of said initiating flow of cleaning liquid and said apparatus for pressurizing and directing flow of gaseous medium;

apparatus for removing filter cake from said filter elements by interaction of cleaning liquid and gaseous medium; and apparatus for moving a second batch of suspension in said first direction through said filter elements.

A further feature of the invention resides broadly in the method for operating and cleaning filter apparatus having filter candles, a portion for receiving a liquid to be filtered, and a portion for receiving liquid when filtered, in cyclical manner, said method comprising the steps of:

(a) introducing said liquid to be filtered in a first direction for filtering solids from said liquid;

(b) building-up filter cake at said filter candles to a predetermined level on a first surface of said filter candles;

(c) by flowing a sheet of cleaning liquid in a first path over a second surface of said filter candles in the direction opposite to said first direction through said filter candles for removal of said filter cake adhered in Step (b), for initiating removal of filter cake;

(d) passing a gaseous medium, in a second path separate from said first path, under sufficient pressure along said flow path of cleaning liquid to ensure effective back-washing of filter cake from said filter candles; and (e) removing dislodged filter cake and cleaning liquid.

Another feature of the invention resided broadly in the filter apparatus including back-washing capability, comprising:

a filter vessel having a portion for receiving a liquid to be filtered, a portion for receiving liquid when filtered, and at least one filter element, said at least one filter element having a first surface for collecting solids as filter cake and a second surface opposite from said first surface;

control apparatus, operatively connected to said filter vessel to control formation of a flowing layer of cleaning liquid at said at least one filter element and to control pressurizing said layer with gaseous medium under pressure;

apparatus, operatively connected to said filter vessel and said control apparatus, for flowing said layer of cleaning liquid along said second surface of said at least one filter element; and apparatus, connected to said control apparatus and configured to interact with said control apparatus, for directing said gaseous medium under pressure separately from said cleaning liquid to apply a pressure on said second surface of said at least one filter element, to act upon said cleaning liquid on said second surface to permeate said cleaning liquid through said at least one filter element, to thus remove filter cake on said first surface of said at least one filter element.

The above-discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintain that this application may include more than one patentably and non-obviously distinct invention. The Applicants hereby assert that the disclosure of this application may include more than one invention, that these inventions may be patentable and non-obvious one with respect to the other.

BRIEF DESCRIPTION OF THE DRAWINGS

The present invention is explained in greater detail below, with reference to the embodiments illustrated in the accompanying drawings.

FIG. 1 is a filter housing or similar vessel with installed filter candles;

FIG. 2 is a transverse sectional cross-section drawn at a larger scale of a part or the upper portion of the filter candle;

DESCRIPTION OF THE PREFERRED EMBODIMENTS

Figure 3:
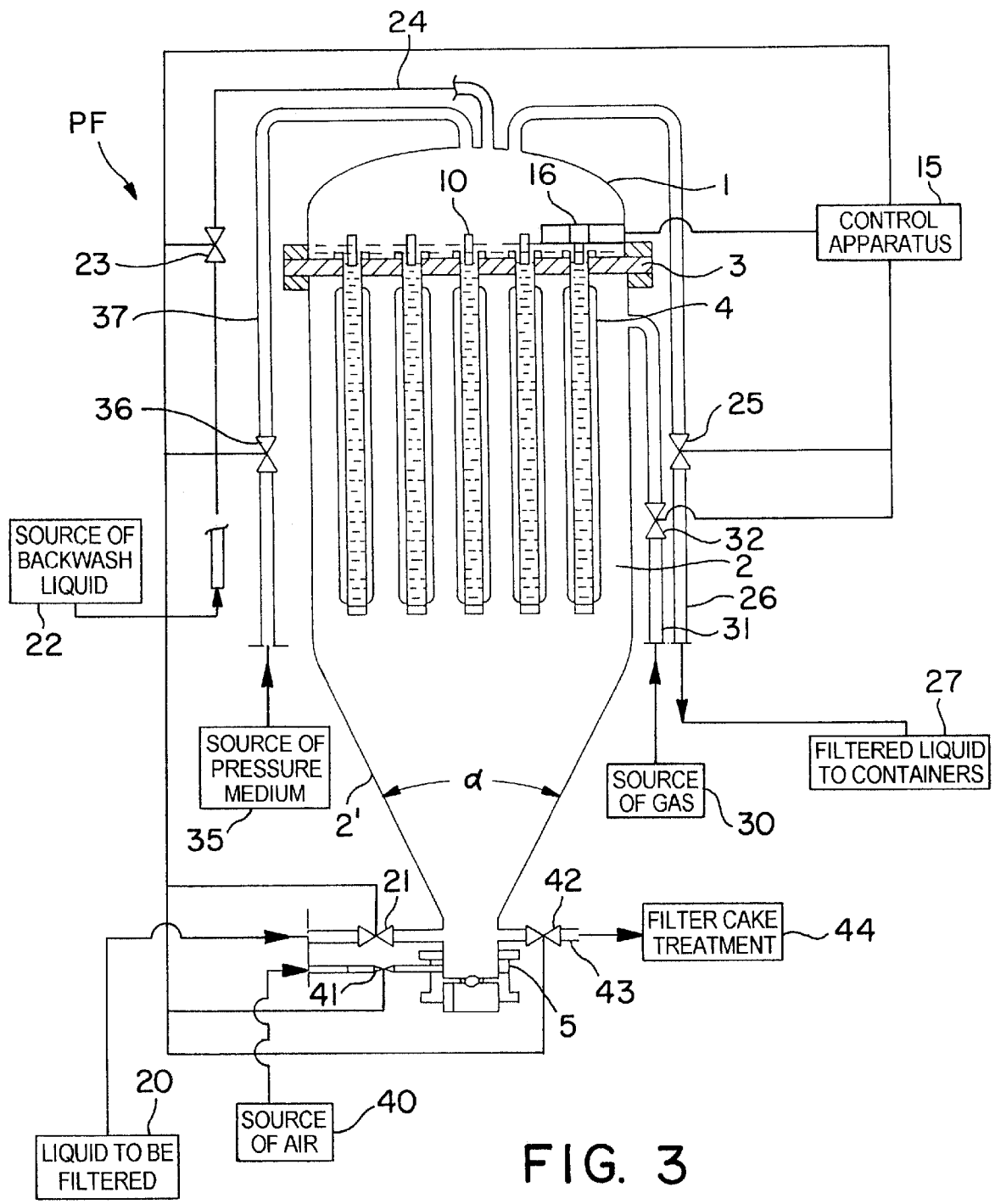
FIG. 3 is schematic diagram of a filter vessel with attendant control for filling filtered liquid into containers.

The reference numeral (1) designates a dome-shaped or bonnet-shaped filtrate space or compartment of the boiler filter, or the like vessel, as filtering equipment, beneath which is an un-filtrate space or compartment (2). The un-filtrate space (2) is comprised of a cylindrical, with a to the bottom in conical manner narrowing, collector space or compartment (2'), the angle of opening alpha of which is approximately 40–70°. Both spaces (1) and, respectively, (2) are separated from one another by an intermediate partition or platform or header (3) with bores for receiving therein filter elements (4). The lower part of the collector space (2') has a nozzle or the gate means or assembly (5), which serves in the introduction and in the suitable distribution of the un-filtrate and for the removal of the filter residues.

In accordance with the embodiment shown in FIG. 2, the forwardly directed opening (6) of the filter candle (4) has openings (7) and (8) which are separate from one another and which with respect to height are terminating at different levels. In this manner, the forwardly directed opening (6) of the filter candle (4) provides for an inlet-line (7) for cleaning fluid (F) and a from this separate and at a higher elevation terminating second inlet-line (8) for a gaseous medium (M) which is impacted by pressure. It is of use thereby that the inlet-line or passage (7) for the cleaning fluid (F) is in the shape of an annular gap or ring gap which, on the one hand, is formed by the interior wall (9) of the filter candle (4) and, on the other hand, by a pipe piece or nipple (10) for the introduction of a gaseous medium (M). This pipe piece or nipple (10) terminates above the filter candle (4) and/or the annular gap or passage (7).

The annular gap or passage (7) formed in this manner, usefully, commences with its extension at the forwardly directed upper end or terminus (11) of the filter candle (4) and/or its securement, and exhibits a length which will ensure a closed and coherent fluid film or layer or sheet formation at the interior wall (12) of the filter candle (4). For improved stream or flow path execution, additionally respectively formed guide elements not shown in detail, but generally identified by reference numeral (14) can be arranged within the annular gap (7). In the in the drawing not shown single-piece embodiment of the top or head portion of the filter curve or candle (4), the throughput opening can be provided by a suitable machinery or the like working of this head portion or terminus.

The above-described embodiment achieves immediately upon passing through of the cleaning medium (M) a film which is unitary and closed, i.e., effectively coherent. The magnitude of this film can be adjusted precisely over the size of the gap (7) and, thus, allows a precise matching of the cleaning process. Particularly in the case of a single-piece head or top part or terminus, the formation of the gap is achieved by aimed milling or by arranging of respective distance level positioning devices (13) in the case of an embodiment of two parts. Over the length of the gap, the film can be matched with the medium and its characteristics. The film produced can be used for cleaning of the interior wall as well as for the outer wall and the pass-through gap of the filter medium. For this, with pre-compressed gas, there is produced a pressure impact which pushes the precisely adjusted medium film, practically, with respect to time, at substantially the same time or substantially simultaneously, at all points in the interior of the filter candle (4) to the exterior. Hereby can also be provided, in separate instances, a pulsating pressure gas contribution, the timed intervals of which correspond to the establishment of a the inner wall again impacting fluid film on pressure gas introduction being carried out.

In other words, a filter candle (4) can be cleaned by an operation such as back-washing by introduction of a gaseous medium under pressure (M) and a cleaning fluid (F), with the two streams being directed in the direction opposite to suspension flow (S), but through separate passages.

In other words, with reference to FIG. 3, numeral (1) designates a dome-shaped or bonnet-shaped filtrate space, compartment or portion for receiving liquid to be or portion for receiving liquid when filtered (2) and a compartment for receiving liquid to be filtered. Both spaces (1) and, respectively, (2) are separated from one another by an intermediate partition or platform or header (3) with bores for receiving therein filter elements (4). The lower part of the collector space (2') has a nozzle or the like gate means or assembly (5), which serves in the introduction and in the suitable distribution of the un-filtrate and for the removal of the filter residues.

In accordance with the embodiment shown in FIG. 3, liquid to be filtered is introduced into the vessel PF at the conical bottom (2'), see reference numeral (20), by being passed through a valve (21'). Valve (21) is connected to a control apparatus (15) by suitable communication. From a source of backwash liquid, generally identified by reference numeral (22) the cleaning liquid passes through valve (23) and line (24) to the filtrate compartment (1). The valve (23) is also connected to the control apparatus (15). A. sensor or the like monitor (16), connected to control apparatus (15), serves to monitor at least the volume of cleaning liquid. Filtered liquid is removed from portion (1) through valve (25) in line or conduit (26), to be passed to containers, e.g. beverage containers. This step being generally identified by reference numeral (27). A source of gas (30) may be used to homogenize filter aid and the suspension to be filtered, and the attendant conduit (31) is controlled with valve (32). To remove filter cake from filter elements (4) a source of pressure medium (35) supplies a gaseous medium under pressure through a valve (36) in line (37) to top portion (1). The valve (36) is operatively connected to the control apparatus (15). Filter cake is removed at gate (5) using a source of air (40), subject to a valve (41). The reference numeral (42) designates a valve in conduit (43) leading to a filter cake treatment station (44).

Figure 4:
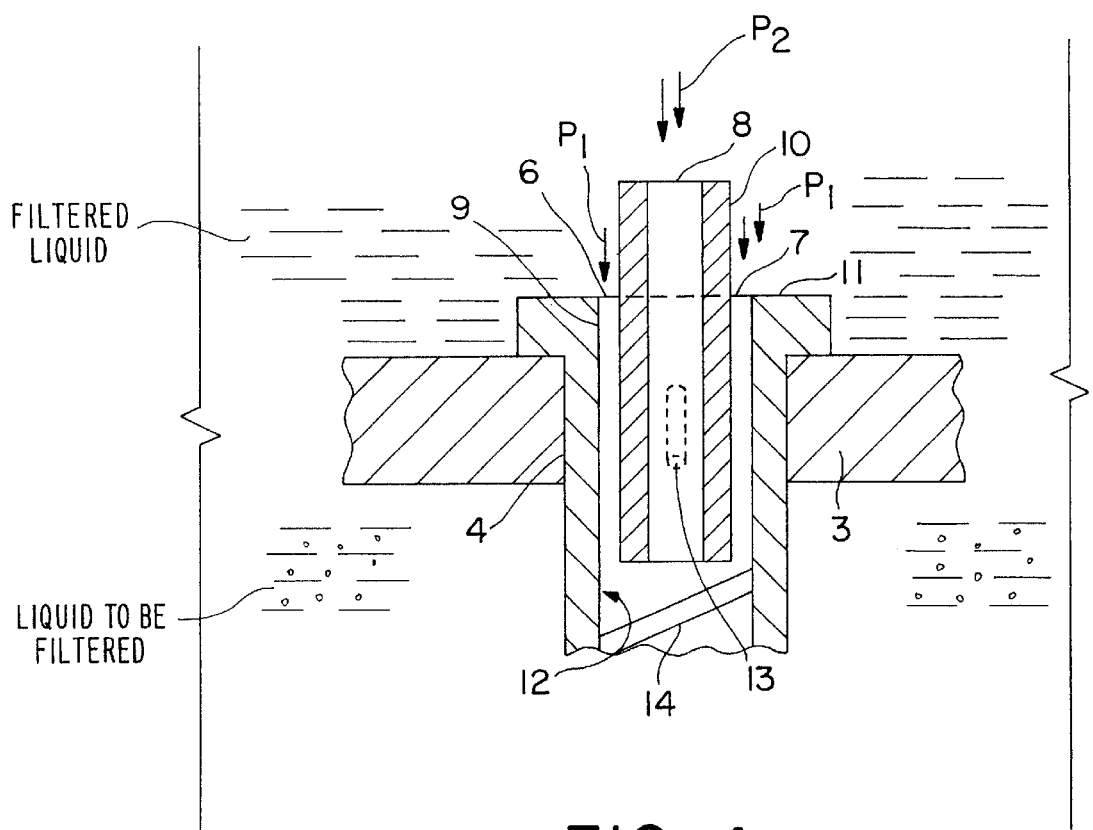
FIG. 4 is a detail drawn to a larger scale of the upper terminus of a filter element.

With reference to FIG. 4, there is provided a nipple (10), which is adjustable as to height by a slide arrangement (13). The forwardly directed opening (6) of the filter element such as a filter candle (4) has openings (7) and (8) which are separate from one another and which with respect to height are terminating at different levels. In this manner, the forwardly directed opening (6) of the filter candle (4) provides for an inlet-line (7) for cleaning fluid (F) generally identified by arrows (P1) and a from this separate and at a higher elevation terminating second inlet-line (8) for a gaseous medium (M), generally identified by arrows (P2) which is impacted by pressure. It is of use thereby that the inlet-line or passage 7 for the cleaning fluid F is in the shape of an annular gap or ring gap which, on the one hand, is formed by the interior wall (9) of the filter candle (4) and, on the other hand, by the movable nipple (10) for the introduction of a gaseous medium (M). This nipple (10) terminates with its opening (8) above the filter candle (4) and/or the annular gap or passage (7). A guide element (14) provided to ensure flow path behavior of the cleaning liquid (F)

Figure 5:
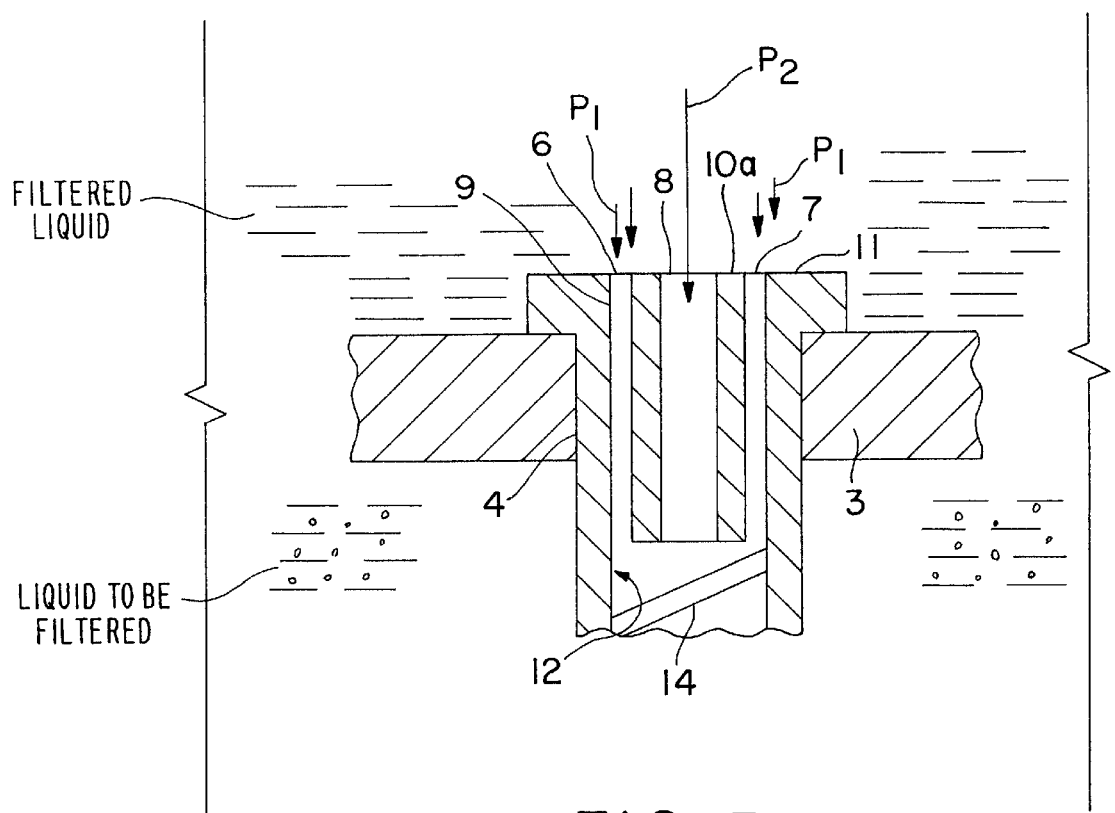
FIG. 5 is a detail drawn to a larger scale of a differently configured upper terminus of a filter element.

With reference to FIG. 5, there is provided a nipple (10a), which is unitary with filter element or candle (4). The forwardly directed opening (6) of the filter element such as filter candle (4), thus has openings (7) and (8) which are separate from one another at about the same level with respect to header (3). In this manner, the forwardly directed opening (6) of the filter candle (4) provides for an inlet-line (7) for cleaning fluid (F) generally identified by arrows (P1) and a from this separate second inlet-line (8) for a gaseous medium (M), generally identified by arrows (P2) which is impacted by pressure. It is of use thereby, also, that the inlet-line or passage (7) for the cleaning fluid (F) is in the shape of an annular gap or ring gap which, on the one hand, is formed by the interior wall (9) of the filter candle (4) and, on the other hand, by the unitary nipple (10a) for the introduction of a gaseous medium (M).

Figure 6:
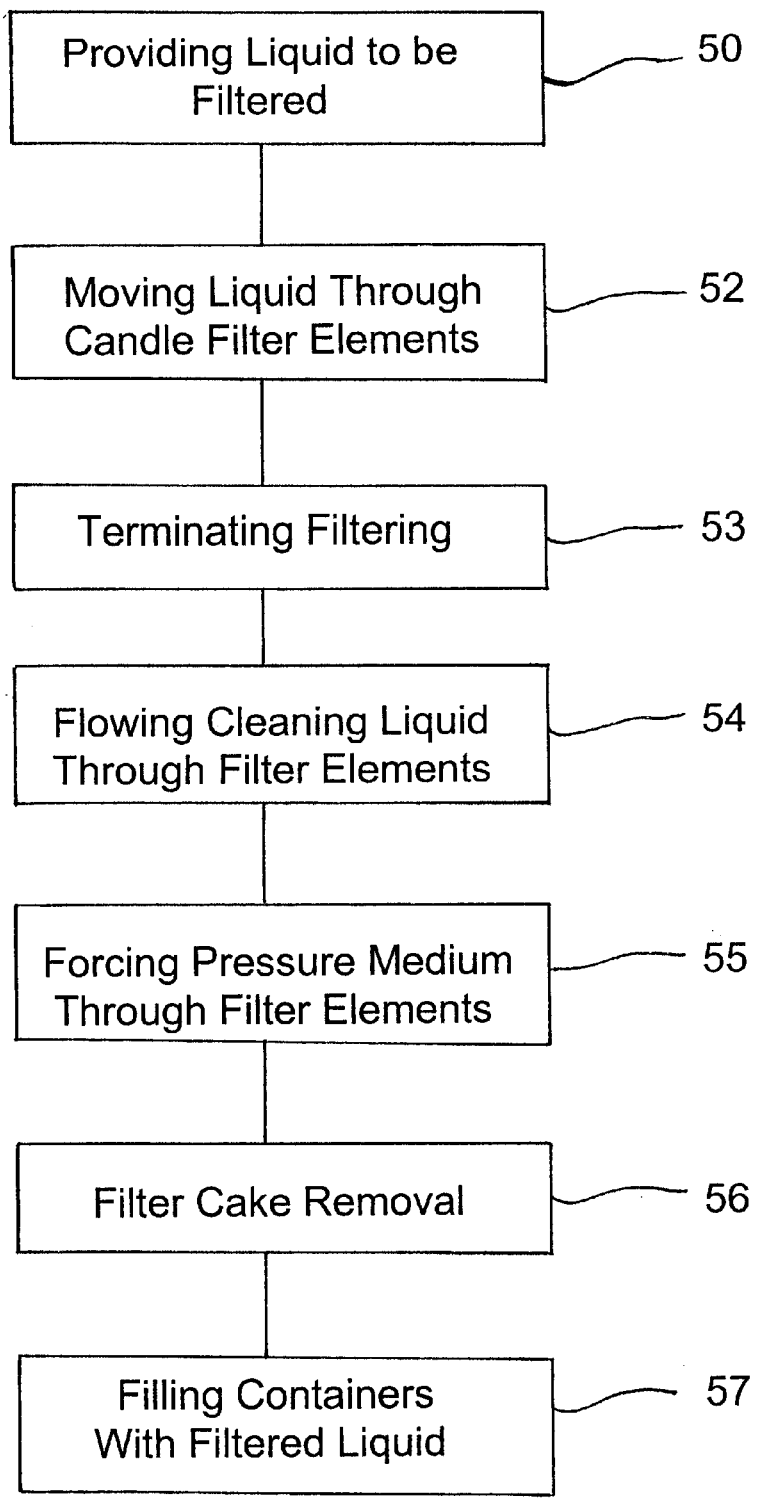
FIG. 6 is a block flow diagram depicting steps of a method in accordance with one embodiment of our invention.

In FIG. 6 is depicted a method of operating our invention, wherein liquid to be filtered is provided in step (50), and this liquid is passed through candle filter elements, as described hereinabove, in step (52). Upon termination (53) of filtering, a cleaning liquid is passed through the filter candle elements (54) and a gaseous medium under pressure is also passed (55) through the candle filter elements, such as (4), described hereinabove. Filter cake removal (56) is done under interaction of cleaning liquid and gaseous medium under pressure and containers, such as beverage containers, can be filled with the liquid when filtered. This is generally identified by reference numeral (57).

Figure 7:
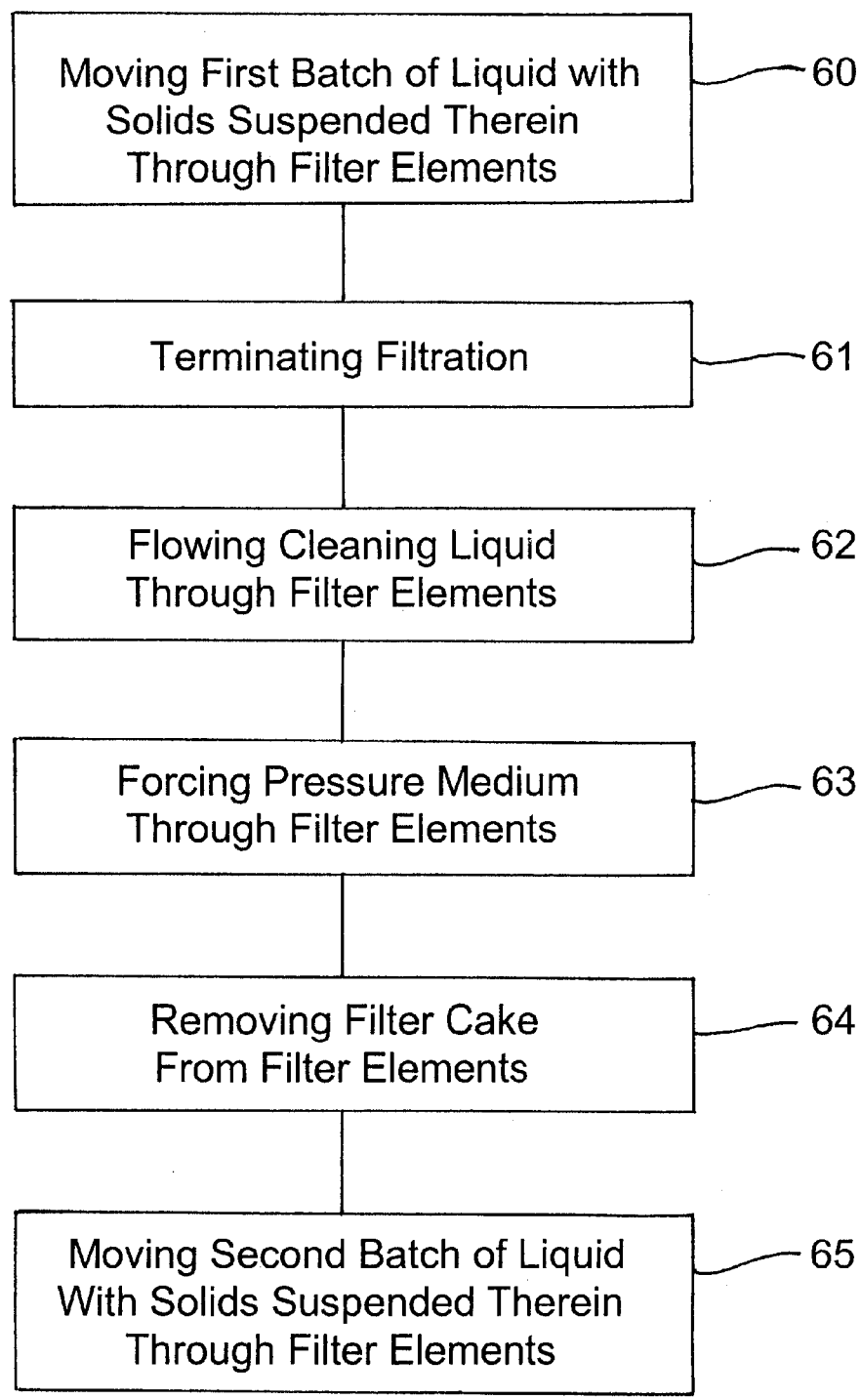
FIG. 7 is a block flow diagram depicting a further method of our invention.

In FIG. 7 is depicted a modified version of a method in accordance with our invention, wherein in step (60) a first batch of liquid with solids suspended therein is moved through filter elements, such as filter. candles (4), and, upon completion of filtration (61), cleaning liquid is flowed (62) through the filter elements with separate introduction (63) of a gaseous medium under pressure. The interaction of the cleaning liquid and the gaseous medium under pressure leads to removal of filter cake (64) from the candle filter elements and a new cycle (65) can be commenced with a second batch of liquid to be filtered.

One feature of the invention resides broadly in the method for cleaning of filter candles 4 of a candle filter using a cleaning fluid which [a] is flowing in from the filtrate-side into the interior space of the filter candle 4, and [b] is pressed or forced, in the direction opposite to the filtrate direction, by a gaseous medium subjected to an overpressure, from the interior to the exterior through the filter candle 4, which is characterized thereby that the cleaning fluid F and the gaseous medium M are introduced into the interior of the filter candle 4 through stream paths 7,8 which are separated from one another.

Another feature of the invention resides broadly in a method which is characterized thereby that under maintaining of introduction of cleaning fluid F a continuous fluid film is maintained at the interior wall 9, 12 and it is impactable by pulsating gaseous pressure introduction.

Yet another feature of the invention resides broadly in a method which is characterized thereby that the distances or time intervals as to time of the pulsating gaseous pressure introduction correspond at least to the time-wise build-up of an at the inner wall again impacting fluid film.

Still another feature of the invention resides broadly in the method which is characterized thereby that the pulsating gaseous pressure introduction is only then commenced when at the inner wall 12 of the filter candle 4 a fluid film has been formed which is present on the entire length.

A further features of the invention resides broadly in the method which is characterized thereby that the cleaning fluid is directly influenced at the candle inner mantle. above the connection position, as an at the candle inner wall 12 down-flowing film, and the gaseous medium is introduced, separate therefrom, through an opening arranged at a distance thereto.

Another feature of the invention resides broadly in the method which is characterized thereby that the cleaning fluid is introduced in spiral-manner through the to it associated flow path 7 into the interior of the filter candle 4.

Yet another feature of the invention resides broadly in a filter arrangement which is capable of back-washing with a between the un-filtrate and filtrate space arranged separation plane and therein held with their upper ends filtrate candles 4, the interior space(s) thereof extends with a forward or frontal opening into the filtrate space which is characterized thereby that the forward or frontal opening is comprised of at least two from one another separate openings 7,8 which with respect to height terminate at different planes.

Still another feature of the invention resides broadly in a filter arrangement capable of back-washing which is characterized thereby that the forward or frontal opening of the filter candle 4 has an inlet-line for cleaning fluid and separate from this and at a higher level terminating second inlet-line for the pressure-impacted gaseous medium.

A further feature of the invention resides broadly in a filter arrangement capable of back-washing which is characterized thereby that the inlet-line 7 for the cleaning fluid is formed as an annular space or gap, which, on the one hand, is provided by the inner wall 12 of the filter candle 4 and, on the other hand, by a pipe piece or nipple 10 for the inlet-line 8 of a gaseous medium and this pipe piece or nipple 10 terminates above the filter candle 4 and/or the annular gap.

Another feature of the invention resides broadly in a filter arrangement capable of back-washing which is characterized thereby that the annular gap commences with the forward or frontal upper end 11 of the filter candle 4 and/or its securement and exhibits such a length which is sufficient for a closed or substantially continuous fluid film formation at the interior wall 12.

Yet another feature of the invention resides broadly in a filter arrangement capable of back-washing which is characterized thereby that the ring gap 7 exhibits guide element for the fluid.

Examples of apparatus and methods which may be used with embodiments of the present invention, may be found in the following U.S. Patents: U.S. Pat. No. 4,186,419 to Sims; U.S. Pat. No. 4,248,713 to Meier; U.S. Pat. No. 4,265,771 to Lennartz et al.; U.S. Pat. No. 4,275,382 to Jannotta; U.S. Pat. No. 4,680,038 to Titus; U.S. Pat. No. 4,764,355 to Romey et al.; U.S. Pat. No. 4,890,490 to Telford; U.S. Pat. No. 4,963,271 to Raehse et al.; U.S. Pat. No. 4,984,449 to Caldwell et al.; U.S. Pat. No. 5,351,036 to Brown et al.; U.S. Pat. No. 5,365,783 to Zweifel; U.S. Pat. No. 5,371,720 to Cuomo; U.S. Pat. No. 5,474,586 to Eaton et al.; U.S. Pat. No. 5,766,467 to Rech et al.; U.S. Pat. No. 5,838,241 to Lease et al.

Examples of apparatus and/or methods which may be associated with the foregoing method and apparatus are contained in the following U.S. Patents: U.S. Pat. No. 4,911,285 to Zodrow et al.; U.S. Pat. No. 4,944,830 to Zodrow et al.; U.S. Pat. No. 4,950,350 to Zodrow et al.; U.S. Pat. No. 4,981,547 to Zodrow et al.; U.S. Pat. No. 5,017,261 to Zodrow et al.; U.S. Pat. No. 5,062,917 to Zodrow; U.S. Pat. No. 5,062,918 to Zodrow; U.S. Pat. No. 5,078,826 to Rogall; U.S. Pat. No. 5,087,317 to Rogall; U.S. Pat. No. 5,110,402 to Buchholz et al.; U.S. Pat. No. 5,129,984 to Tomashauser et al., U.S. Pat. No 5,167,755 to Zodrow et al.; U.S. Pat. No. 5,174,851 to Zodrow et al.; U.S. Pat. No. 5,185,053 to Tomashauser et al.; U.S. Pat. No. 5,217,538 to Buchholz et al.; U.S. Pat. No. 5,227,005 to Zodrow et al.; U.S. Pat. No. 5,5569,353 to Zodrow; and U.S. Pat. No. 5,713,403 to Clusserath et al.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The following patents, patent applications, or patent publications, which were cited in the instant application and/or International Search Report are hereby incorporated by reference as if set forth in their entirety herein as follows: German Laid Open Patent Application No. 2 227 821, German laid Open Patent Application No. 195 18 575 A1, and U.S. Pat. No. 5,437,788 to S. A. Geibel et al.

The corresponding foreign and international patent publication applications, namely, Federal Republic of Germany Patent Application No. 198 37 569.7, filed on Aug. 19, 1998, having inventors Roland Kruger, Markus Kolczyk, Rainer Kuhnt, and Dietmar Oechsle; and International Application No. PCT/EP99/05768, filed on Aug. 9, 1999, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

This invention as described hereinabove in the context of the preferred embodiments is not to be taken as limited to all of the provided details thereof, since modifications and variations thereof may be made without departing from the spirit and scope of the invention.

What is claimed is:

1. A method of operating a plant in which containers are filled with liquid, said method comprising the steps of:
   (a) moving containers to a filling machine;
   (b) filling said containers with liquid when filtered;
   (c) removing filled containers from said filling machine, said filtered liquid being produced by
   (d) providing a liquid to be filtered in a first batch to a filter apparatus having candle filter elements, at least a portion for receiving liquid to be filtered, and a portion for receiving liquid when filtered;
   (e) moving said first batch of said liquid to be filtered in a first direction from a first surface to a second surface of said candle filter elements, from said portion receiving liquid to be filtered, through said candle filter elements and thereby collecting solids at said first surface of said candle filter elements as filter cake;
   (f) terminating filtering according to steps (d) and (e);
   (g) initiating flow of a cleaning liquid along a first flow path, over said second surface, for inducing removal of filter cake from said candle filter elements by flowing a sheet of cleaning liquid over said second surface;
   (h) pressurizing and directing a flow of gaseous medium in a second flow path separate from said first flow path to force said sheet of cleaning liquid flowing on said second surface through said candle filter elements from said second surface to said first surface, to dislodge said filter cake on said first surface of said candle filter elements;
   (i) removing filter cake from said first surface of said candle filter elements by the interaction of cleaning liquid and gaseous medium;
   (j) terminating cleaning according to steps (g), (h) and (i); and
   (k) moving a second batch of liquid to be filtered in said first direction through said candle filter elements.

2. The method of claim 1, wherein said step (g) includes flowing said cleaning liquid to provide a layer of cleaning liquid.

3. The method of claim 2, wherein said step (g) includes flowing said cleaning liquid to provide a film of cleaning liquid.

4. The method of claim 3, wherein said cleaning liquid provides a film on said first surface of said candle filter elements.

5. A method of operating and cleaning filter apparatus having filter elements, at least a portion for receiving liquid to be filtered, and a portion for receiving liquid when filtered, said method comprising the steps of:
(a) moving a first batch of said liquid to be filtered in a first direction from said portion for receiving liquid to be filtered through said filter elements from a first surface to a second surface of said filter elements and thereby collecting solids at said first surface of said filter elements as filter cake;
(b) terminating filtering according to step (a);
(c) initiating flow of a cleaning liquid along a first flow path, over said second surface of said filter elements, for inducing removal of filter cake from said filter elements by a flowing layer of cleaning liquid;
(d) pressurizing and directing a flow of gaseous medium in a second flow path separate from said first flow path and substantially adjacent to said second surface, to force said cleaning liquid passing over said second surface to permeate from said second surface to said first surface of said filter elements and to dislodge said filter cake on said first surface of said filter elements;
(e) terminating cleaning according to steps (c) and (d);
(f) removing filter cake from said first surface of said filter elements by the interaction of cleaning liquid and gaseous medium; and
(g) moving a second batch of liquid to be filtered in said first direction through said filter elements.

6. The method of claim 5, wherein said step (c) includes flowing cleaning liquid in a quantity sufficient to form a substantially continuous layer of cleaning liquid at said second surface; and wherein said step (d) includes pressurizing a flow of gaseous medium in pulsating manner to operatively impact it on said substantially continuous layer of cleaning liquid.

7. The method of claim 6, wherein cleaning liquid is allowed to cascade down said second surface as a film, and then introducing said pulsating gaseous pressure in time intervals in conformity with the time-wise build-up of said film of cleaning liquid.

8. The method of claim 6, wherein said flowing layer of cleaning liquid is established prior to introduction of said pulsating gaseous pressure.

9. The method of claim 5, wherein at least one filter element has a first terminus extending into said portion for receiving liquid when filtered, and said portion for receiving liquid when filtered has at least one channel for passing said gaseous medium through it and being configured to commence a predetermined distance away from said first terminus of said at least one filter element; and further comprising: introducing cleaning liquid in accordance with step (c) directly at said second surface at said first terminus to flow therealong as down-flowing layer; and introducing gaseous medium through said at least one channel in accordance with step (d), concurrently and separately with said cleaning liquid.

10. The method of claim 5, comprising introducing said cleaning liquid in spiral manner along said first flow path into the interior of at least one filter element.

11. A plant in which containers are filled with liquid, comprising:
apparatus for moving containers to a filling machine;
a machine for filling said containers with liquid when filtered;
apparatus for removing filled containers from said filling machine;
said filtered liquid is produced by
apparatus for providing a liquid to be filtered in a first batch to a filter apparatus having candle filter elements, at least a portion for receiving liquid to be filtered, and a portion for receiving liquid when filtered;
apparatus for moving said first batch of said liquid to be filtered in a first direction from a first surface to a second surface of said candle filter elements, from said portion receiving liquid to be filtered, through said candle filter elements and thereby collecting solids at said first surface of said candle filter elements as filter cake;
apparatus for terminating filtering by said filter apparatus;
apparatus for initiating flow of cleaning liquid along a first flow path, over said second surface, for inducing removal of filter cake from said candle filter elements by flowing a sheet of cleaning liquid over said second surface;
apparatus for pressurizing and directing a flow of gaseous medium in a second flow path separate from said first flow path to force said cleaning liquid flowing on said second surface through said candle filter elements from said second surface to said first surface, to dislodge said filter cake on said first surface of said candle filter elements;
apparatus for removing filter cake from said first surface of said candle filter elements by the interaction of cleaning liquid and gaseous medium;
apparatus for terminating operation of said apparatus for initiating flow of a cleaning liquid, of said apparatus for pressurizing a flow of gaseous medium, and of said filter cake removal apparatus; and
apparatus for moving a second batch of liquid to be filtered in said first direction through said candle filter elements.

12. The plant in accordance with claim 11, and further including control apparatus operatively connected to said portion for receiving liquid when filtered, for actuating at least valve apparatus between said machine for filling containers and said portion for receiving liquid when filtered.

13. The plant in accordance with claim 12, and including sensor apparatus operatively connected to said control apparatus for monitoring at least flow of cleaning liquid.

14. A plant for operating and cleaning filter apparatus having filter elements, at least a portion for receiving liquid to be filtered, and a portion for receiving liquid when filtered, said plant comprising:
apparatus for moving a first batch of liquid to be filtered in a first direction from said portion for receiving liquid to be filtered through said filter elements from a first surface to a second surface of said filter elements and thereby collecting solids at said first surface of said filter elements as filter cake;
apparatus for terminating filtering by said apparatus for moving a first batch of said liquid to be filtered;
apparatus for initiating flow of cleaning liquid along a first flow path, over said second surface of said filter elements, for inducing removal of filter cake from said filter elements by a flowing layer of cleaning liquid;

apparatus for pressurizing and directing flow of gaseous medium in a second flow path separate from said first flow path and substantially adjacent to said second surface, to force said cleaning liquid passing over said second surface to permeate from said second surface to said first surface of said filter elements and to dislodge said filter cake on said first surface of said filter elements;

apparatus for terminating flow of cleaning liquid and flow of gaseous medium;

apparatus for removing filter cake from said first surface of said filter elements by the interaction of cleaning liquid and gaseous medium; and apparatus for moving a second batch of liquid to be filtered in said first direction through said filter elements.

15. The filter apparatus in accordance with claim 14, and including:

apparatus for separating said portion for receiving liquid to be filtered and said portion for receiving liquid when filtered;

with at least one of said filter elements having a first terminus for securing it at said separating apparatus, and having a dual-ported orifice formation for communicating the interior space of said at least one filter element with said portion for receiving liquid when filtered, and said dual-ported orifice formation being configured to provide two orifices extending separately from one another and terminating at different planes.

16. The filter apparatus in accordance with claim 15, wherein said dual-ported orifice formation is connected to a first inlet-line for cleaning liquid and to a second inlet-line for gaseous medium, said first and second inlet-lines being configured to extend separate from one another.

17. The filter apparatus in accordance with claim 16, and further including a pipe piece operatively connected to at least one filter element, said pipe piece including a first terminus for connecting it to said second inlet-line for gaseous medium, and wherein said first inlet-line for cleaning liquid is a walled space which is provided, on the one hand, by said second surface of said at least one filter element and, on the other hand, by the outer wall of said pipe piece, and said pipe piece terminating above said first terminus of said at least one filter element.

18. The filter apparatus in accordance with claim 17, wherein said pipe piece is movably adjustable as to position with respect to said separating apparatus.

19. The filter apparatus in accordance with claim 17, wherein said walled space is an annular gap which commences at said separation apparatus and which has a length sufficient for generating an operative flowing layer of cleaning liquid at said second surface of said at least one filter element.

20. The filter apparatus in accordance with claim 19, wherein said annular gap is a concentric gap, and further including at least one guide element operatively connected to said second surface of said at least one filter element for guiding cleaning liquid at said concentric gap.

* * * * *